United States Patent [19]

Mair

[11] Patent Number: 5,399,919
[45] Date of Patent: Mar. 21, 1995

[54] APPARATUS FOR DETECTING SWITCH ACTUATION

[75] Inventor: Hugh Mair, Allen, Tex.

[73] Assignee: Texas Instruments Incorporated, Dallas, Tex.

[21] Appl. No.: 23,038

[22] Filed: Feb. 25, 1993

[51] Int. Cl.$^6$ .................... H03K 19/094; H03K 19/21
[52] U.S. Cl. ....................... 326/105; 341/96; 326/52
[58] Field of Search .............. 307/451, 449, 463, 471; 341/96–98

[56] References Cited

U.S. PATENT DOCUMENTS

| | | | |
|---|---|---|---|
| 2,917,734 | 12/1959 | Carbrey | 341/98 |
| 3,945,000 | 3/1976 | Suzuki et al. | 307/451 |
| 4,350,905 | 9/1982 | Sato | 307/449 |
| 4,541,067 | 9/1985 | Whitaker | 307/471 |
| 4,571,510 | 2/1986 | Seki et al. | 307/451 |
| 4,975,698 | 12/1990 | Kagey | 341/96 |
| 5,134,311 | 7/1992 | Biber et al. | 307/270 |
| 5,220,216 | 6/1993 | Woo | 307/451 |
| 5,227,679 | 7/1993 | Woo | 307/451 |

*Primary Examiner*—Edward P. Westin
*Assistant Examiner*—Richard Roseen
*Attorney, Agent, or Firm*—Christopher L. Maginniss; W. James Brady, III; Richard L. Donaldson

[57] ABSTRACT

Apparatus for generating an output signal in response to the change in state of any one of a plurality of input signals. The apparatus includes decoding means for each possible combination of input signals, and by an appropriate arrangement of these decoding means, ensures that any change in input signal status causes an output signal to be generated by the arrangement of decoding means. The decoding means includes first and second arrays 10, 12, each comprising a matrix of MOS FET's; the FET's $30_{ij}$ of the first array 10 are p-channel devices and the FET's $32_{ij}$ of the second array 12 are n-channel devices. The matrix of each array is a paralleled configuration of series-connected branches of FET's functioning as decoders. The branches of each array decode input signal combinations of minimum distance two from one another. Arrays 10 and 12 are interconnected in such a manner that they draw no dc current (other than device leakage current). Any change in binary state of any one of the input signals results in the branches of FET's which decode the switch conditions alternating between n-channel and p-channel devices. As these alternations take place, the node 34 joining arrays 10 and 12 is switched between first and second voltage levels. A one shot circuit 14 converts each of these voltage transitions into an output signal pulse.

9 Claims, 1 Drawing Sheet

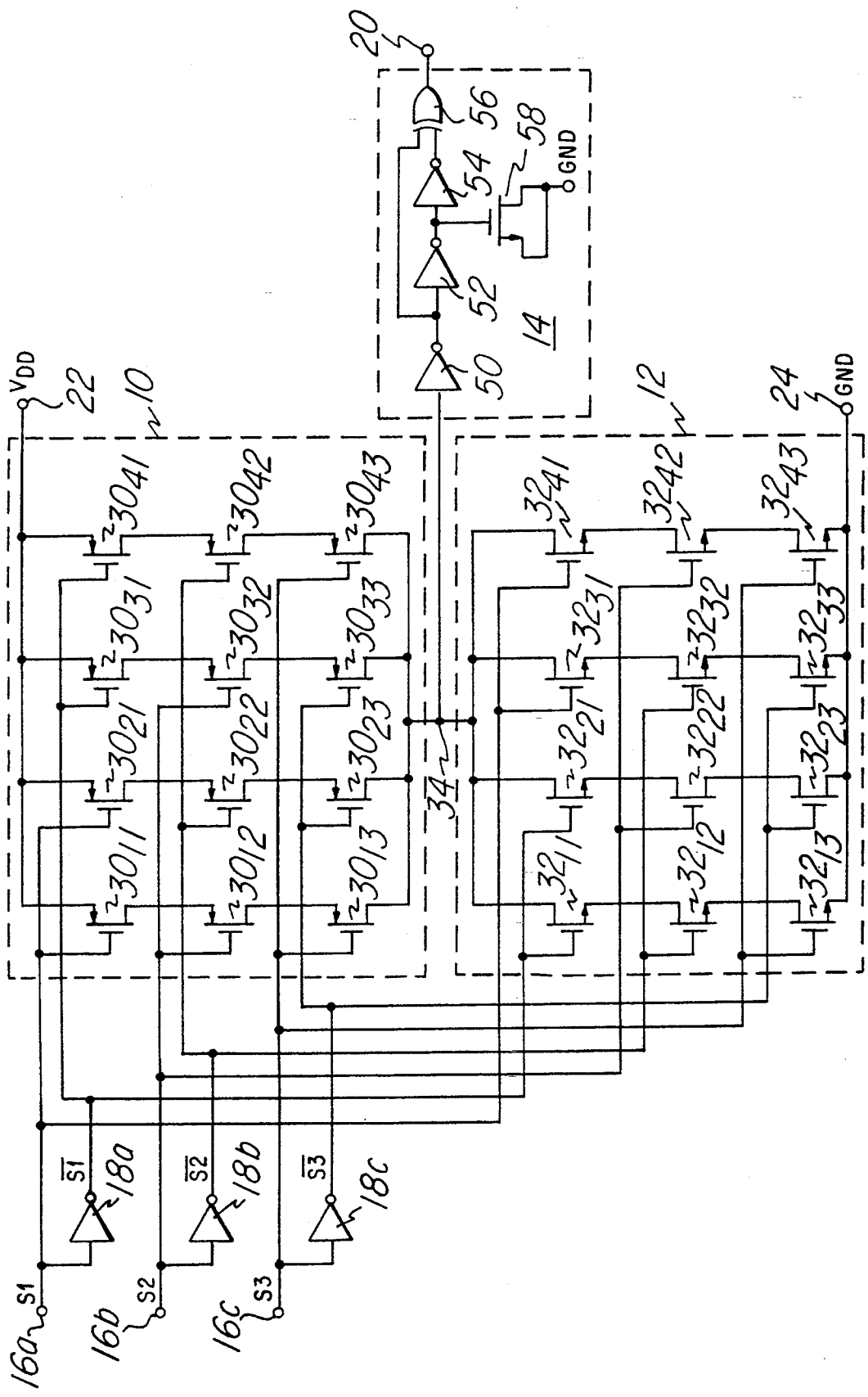

APPARATUS FOR DETECTING SWITCH ACTUATION

BACKGROUND OF THE INVENTION

The present invention relates generally to digital electronic circuits and, more particularly, to an apparatus for detecting a change of binary state of any one of a plurality of signals.

Keyless locks have become an increasingly attractive feature of new automotive vehicles in recent years. Using one such apparatus, the owner of a vehicle may remotely arm or disarm an alarm system, or operate the locks of the driver's side door, the passenger's side door or the trunk, by the actuation of the appropriate pushbutton switch on a small remote unit. A transmitter in the remote unit sends a digitally-coded RF sisal to a receiver in the vehicle, which responds in accordance the particular switch actuation. For convenience, the remote unit is ideally very small, desirably, of a size which can be attached to a keyring.

The need for compactness in such a unit necessitates its miniaturization in all aspects, particularly in the realm of power source, which cannot be expected to exceed the size of the lithium watch-type batteries. The concept of miniaturization extends also to efficiency in the use of integrated circuit chip area, which may impact significantly on the overall size of the remote transmitter unit.

In view of the extremely small battery capacity available to such remote unit, and further in view of a consumer's expectation that such unit shall operate for a matter of five years without battery replacement, it is clear that the unit must not said battery current when in its inactive state. From this, it is seen that the remote unit must include a wake-up circuit which activates the transmitter circuitry upon actuation of any of the switches. The concept of a wake-up circuit in this general type of application is well known, but the power constraints in this particular case drive the design to require that even the wake-up circuit must not draw current (other than device leakage) in its quiescent state.

As a consumer product operated from batteries, there is imposed on the wake-up circuit a further constraint of being capable of operating over a relatively wide range of voltages. Whereas, the nominal battery voltage may be 4.5 volts in order to operate with standard logic devices, it is anticipated that a fully-charged set may run as high as seven volts. Further, it is expected that the unit will operate as the batteries reach their end-of-life voltage, which may be as low as three volts. Hence, designing in a reasonable margin, the circuit should operate from supply voltages ranging from 3.0 volts to 9.0 volts. Thus, the area of the integrated circuit is a consideration since an overhead of fifty per cent is likely to be attributable to the use of high voltage devices.

By the very nature of its use, ordinary handling of such a unit imposes an additional constraint on its design. Keys are typically carried in pockets and purses. With such handling, it will be recognized that the remote transmitting unit described above might be wedged into a position such that one or more of the pushbuttons would inadvertently be held in an actuated position for an extended period of time. If this actuation were to drain power from the batteries, the unit might be rendered useless in a matter of hours. It is therefore an additional requirement on the design of the detecting circuit of such a unit that no power will be drawn from the batteries while the pushbuttons are in any quiescent state.

Of the families of integrated circuit devices currently available, it would appear that the requirements stated above lend themselves to the use of complementary metal oxide semiconductor (CMOS) devices. These devices can be fabricated with high densities, they work over a relatively wide range of voltages, and, most importantly, they draw zero dc current (apart from junction leakage current).

One way to implement such a detecting circuit using CMOS devices is to couple a monostable multivibrator (one shot circuit) to each switch input signal. The individual outputs of these one shots would be combined by an additional logic function to produce a single output signal representing a change in state of any one of the input signals. However, this approach may require an excessive area of the integrated circuit chip.

In view of the above, it is dear that there exists a need to develop an improved apparatus for detecting a change of binary state of any one from among a plurality of signals, which apparatus draws zero dc current from the power supply and which can be implemented on an integrated circuit chip in less area than is required by methods which may be currently known in the art.

SUMMARY OF THE INVENTION

In accordance with the principles of the present invention, there is disclosed herein an apparatus for providing a voltage level transition at a node in response to a change in binary state of any of a plurality of digital input signals. The apparatus comprises first decoding means responsive to a first set of input signal conditions for enabling a first voltage at the node, and second decoding means responsive to a second set of input signal conditions for enabling a second voltage at the node. All of the conditions of the input signals are included in either the first set or the second set; all of the conditions of the first set differ from one another by the binary states of at least two of the input signals and all of the conditions of the second set differ from one another by the binary states of at least two of the input signals.

Further in accordance with the present invention there is disclosed an apparatus for generating a signal pulse in response to a change in binary state of any of n digital input signals, wherein n>1. The apparatus includes a first array comprising switching transistors of a first conduction type and responsive to a first voltage level at their control electrodes for providing conduction therethrough, the switching transistors of the first array configured as $2^{n-1}$ paralleled branches of series-connected switching transistors, wherein each branch comprises n switching transistors, the paralleled branches being coupled between a first potential and a node. The apparatus further includes a second array comprising switching transistors of a second conduction type and responsive to a second voltage level at their control electrodes for providing conduction therethrough, the switching transistors of the second array configured as $2^{n-1}$ paralleled branches of series-connected switching transistors, wherein each branch comprises n switching transistors, the paralleled branches being coupled between a second potential and said node. The apparatus additionally includes means for coupling the input signals and their complements selectively to the control electrodes of the switching transistors of the first and the second arrays. All of the conditions of the input signals are decoded by the branches of either the first array or the second array; all of the conditions at the branches of the first array differ from one another by the binary states of at least two of the input signals; and all of the conditions at the branches of the second array differ from one another by the binary states of at least two of the input signals. Finally, the apparatus includes means responsive to a voltage level transition at the node for generating a signal pulse.

BRIEF DESCRIPTION OF THE DRAWING

The foregoing features of the present invention may be more fully understood from the following detailed description, read in conjunction with the accompanying drawing, wherein:

FIG. 1 is a circuit and logic schematic of the detecting apparatus in accordance with the present invention; and FIG. 2 is a logic truth table useful in understanding the apparatus of FIG. 1.

DESCRIPTION OF THE PREFERRED EMBODIMENT

The detecting apparatus of the present invention generates an output signal in response to the change in state of any one of a plurality of input signals. The detecting apparatus includes decoding means for each possible combination of input signals, and by an appropriate arrangement of these decoding means, ensures that any change in status of an input signal causes an output signal to be generated by the arrangement of decoding means. This function is accomplished with logic devices selected and interconnected in such a manner that they draw no dc current (other than device leakage current).

In the generalized case of n input signals, each with two possible states (logic "1" or logic "0"), the number of possible input combinations is $2^n$, each of which may be expressed as a unique binary code. In the present example illustrating three input signals, the number of possible input combinations, or binary codes, is $2^3 = 8$, the codes being 000, 001, 010, 011, 100, 101, 110 and 111. An important aspect of the present invention relates to the arrangement of these $2^n$ binary codes into two groups, with $2^{n-1}$ codes in each group, such that each group of codes has a minimum distance of two. That is, within a group, every code in the group differs from every other code in the same group by at least two bits. In this example, one group would comprise the codes 000, 011, 101 and 110, and the other group would comprise the codes 001, 010, 100 and 111. It will be recognized by those knowledgeable in the field of binary codes, that for any value of n, there is a unique set of two groups of codes which satisfy this criterion.

Referring now to the FIG. 1, there is disclosed an apparatus for detecting a change in binary state of any one of a plurality of input signals. In the illustrative example, there are three input signals, denoted S1, S2 and S3; nevertheless, it will be recognized that the concept of the invention extends to any number of input signals of two or more. The FIG. 1 illustrates a first array 10 comprising a matrix of p-channel metal oxide semiconductor (MOS) field effect transistors (FET's), referred to generally as PMOS FET's $30_{ij}$, and a second array 12 comprising a matrix of n-channel MOS FET's, referred to generally as NMOS FET's $32_{ij}$.

In this example, array 10 comprises a paralleled configuration of four series-connected branches of PMOS FET's $30_{ij}$, wherein each branch comprises three FET's, e.g., one such branch comprises FET's $30_{11}$, $30_{12}$ and $30_{13}$. The supply voltage, designated $V_{DD}$, which is applied at terminal 22, is coupled to node 34 if all three FET's in any one branch of array 10 are enabled by a sufficiently low voltage at their gate electrodes. Similarly, array 12 comprises a paralleled configuration of four series-connected branches of NMOS FET's $32_{ij}$, wherein each branch comprises three FET's, e.g., one such branch comprises FET's $32_{11}$, $32_{12}$ and $32_{13}$. The reference voltage, designated GND, which is applied at terminal 24, is coupled to node 34 if all three FET's in any one branch of array 12 are enabled by a sufficiently high voltage at their gate electrodes. Arrays 10 and 12 are joined at node 34 which forms the input to one shot circuit 14.

The three input signals, S1, S2 and S3, are coupled, respectively, to input terminals 16a, 16b and 16c. Inverters 18a, 18b and 18c generate signals the inverses, respectively of $\overline{S1}$, $\overline{S2}$ and $\overline{S3}$. Signals S1, S2, S3, $\overline{S1}$, $\overline{S2}$ and $\overline{S3}$ are selectively applied to the gate electrodes of FET's $30_{ij}$ and $32_{ij}$ to effect appropriate decodes.

In particular, consider first the p-channel FET's of array 10. Recognizing that p-channel devices are enabled by a more negative gate voltage, the branch of PMOS FET's comprising FET's $30_{11}$, $30_{12}$ and $30_{13}$ decode the condition of the input signals as S1=0, S2=0 and S3=0; the branch of PMOS FET's comprising FET's $30_{21}$, $30_{22}$ and $30_{23}$ decode the condition of the input signals as S1=0, S2=1 and S3=1; the branch of PMOS FET's comprising FET's $30_{31}$, $30_{32}$ and $30_{33}$ decode the condition of the input signals as S1=1, S2=0 and S3=1; and the branch of PMOS FET's comprising FET's $30_{41}$, $30_{42}$ and $30_{43}$ decode the condition of the input signals as S1=1, S2=1 and S3=0. Consider now the n-channel FET's of array 12. Recognizing that n-channel devices are enabled by a more positive gate voltage, the branch of NMOS FET's comprising FET's $32_{11}$, $32_{12}$ and $32_{13}$ decode the condition of the input signals as S1=0, S2=0 and S3=1; the branch of NMOS FET's comprising FET's $32_{21}$, $32_{22}$ and $32_{23}$ decode the condition of the input signals as S1=0, S2=1 and S3=0; the branch of NMOS FET's comprising FET's $32_{31}$, $32_{32}$ and $32_{33}$ decode the condition of the input signals as S1=1, S2=0 and S3=0; and the branch of NMOS FET's comprising FET's $32_{41}$, $32_{42}$ and $32_{43}$ decode the condition of the input signals as S1=1, S2=1 and S3=1. It is thus easily seen that one and only one of the series-connected branches of FET's from among arrays 10 and 12 is enabled in response to the particular condition of input signals S1, S2 and S3, and, furthermore, that as any one of these input signals changes binary state, the decoding branch of FET's alternates between n-channel and p-channel devices. FIG. 2 is a logic truth table which summarizes the preceding discussions relating to decoder arrays 10 and 12.

One shot circuit 14 comprises buffer 50, inverters 52 and 54, exclusive OR gate 56 and NMOS FET 58, functioning as a capacitive delay element. The signal transition which occurs at node 34 in conjunction with every input signal state change is inverted by buffer stage 50. The output signal from buffer 50 is coupled directly to a first input terminal of exclusive OR gate 56, and is coupled via delaying elements 52, 58 and 54, to the second input signal of exclusive OR gate 56. As a result, during the delay period, the logic levels at the inputs of gate 56 are different, and its output level, which is coupled to output terminal 20, pulses to a logic "1" for that period.

Thus, it is seen that any change in binary state of any one of the input signals S1, S2 or S3 results in the branches of FET's which decode the switch conditions alternating between n-channel and p-channel devices. As these alternations take place, node 34 is switched between the supply voltage, $V_{DD}$, and the reference voltage, GND. One shot 14 converts each of these voltage transitions at node 34 into a brief signal pulse at output terminal 20. It may be easily seen how this signal pulse may be used as a wake-up signal to the transmitter portion of a remote unit.

It will be noted that the apparatus disclosed above includes devices which remain in their quiescent states so long as there is no change in the states of the input signals. It will also be noted that there is no dissipation from sources of bias voltages. As a result, when the elements of this apparatus are implemented as CMOS devices, no dc current (other than device leakage current) is drawn by this apparatus.

While the apparatus as embodied in FIG. 1 detects a change in binary state of any one of three input signals, the principles of the present invention apply equally to any number of input signals greater than one. As an example, if the number of input signals were two, there would be four possible binary codes of input combinations, and arrays 10 and 12 would each comprise two paralleled branches of two FET's each. Likewise, if the number of input signals were four, there would be sixteen possible binary codes of input combinations, and arrays 10 and 12 would each comprise eight paralleled branches of four FET's each. In general, for n input signals, it may been seen that there would be $2^n$ possible binary codes of input combinations, and arrays 10 and 12 would each comprise $2^{n-1}$ paralleled branches of n FET's each.

The apparatus for detecting a change of binary state of any one of a plurality of input signals, as illustrated in FIG. 1 and as described above, overcomes certain limitations of prior art approaches. In one such approach, a monostable multivibrator, of the type shown as one shot circuit 14 in FIG. 1, may be coupled to each input signal line. The individual outputs from each of these one shots would be combined by an additional logic ORing function to produce a single output signal representing a change in state of any one; of the input signals. However, for a relatively small number of input signals, this approach may require an excessive area of the integrated circuit chip. In particular, it has been determined that for an implementation of three or four input signals, the multiple one shot approach requires approximately 82 per cent more integrated circuit chip area than does the approach in accordance with the invention disclosed herein. Only when the number of input signals reaches seven does the multiple one shot approach require less chip area. Hence, for the remote transmitter unit envisioned here, having a relatively small number of pushbuttons, the approach in accordance with the present invention provides a significant advantage.

While the principles of the present invention have been demonstrated with particular regard to the structure disclosed herein, it will be recognized that various departures may be undertaken in the practice of the invention. The scope of the invention is not intended to be limited to the particular structure disclosed herein, but should instead be gauged by the breadth of the claims which follow.

What is claimed is:

1. Apparatus for providing a voltage level transition at a node in response to a change in logic voltage level of any of a plurality of digital input signals, said apparatus comprising:

first decoding means receiving said digital input signals and responsive to a first set of binary combinations of input signal logic voltage levels for enabling a first voltage at said node;

second decoding means receiving said digital input signals and responsive to a second set of binary combinations of input signal logic voltage levels for enabling a second voltage at said node, all of the binary combinations of the first set differing from one another by the logic voltage levels of at least two of said input signals, and all of the binary combinations of the second set differing from one another by the logic voltage levels of at least two of said input signals; and means responsive to the voltage level transition at said node for generating a signal pulse.

2. The apparatus in accordance with claim 1 wherein said generating means comprises a monostable multivibrator.

3. The apparatus in accordance with claim 1 wherein said first decoding means comprises a first array of transistors of a first conduction type and responsive to a first potential at their control electrodes for providing conduction therethrough, said transistors of said first array configured as paralleled branches of series-connected transistors, wherein each branch comprises transistors equal in number to the input signals; and wherein said second decoding means comprises a second array of transistors of a second conduction type and responsive to a second potential at their control electrodes for providing conduction therethrough, said transistors of said second array configured as paralleled branches of series-connected transistors, wherein each branch comprises transistors equal in number to the input signals.

4. The apparatus in accordance with claim 3 wherein said transistors comprise field effect transistors (FET's).

5. The apparatus in accordance with claim 4 wherein said transistors of said first array comprise p-channel FET's and said transistors of said second array comprise n-channel FET's, and wherein said first potential is positive with respect to said second potential.

6. Apparatus for generating a signal pulse in response to a change in logic voltage level of any of n digital input signals, wherein n>1, said apparatus comprising:

a first array comprising transistors of a first conduction type and responsive to a first potential at their control electrodes for providing conduction therethrough, said transistors of said first array configured as $2^{n-1}$ paralleled branches of series-connected transistors, wherein each branch comprises n transistors, said paralleled branches being coupled between a first potential and a node;

a second array comprising transistors of a second conduction type and responsive to a second potential at their control electrodes for providing conduction therethrough, said transistors of said second array configured as $2^{n-1}$ paralleled branches of series-connected transistors, wherein each branch comprises n transistors, said paralleled branches being coupled between a second potential and said node;

means for coupling said input signals and their binary complements selectively to the control electrodes of said transistors of said first and said second arrays, said branches of said first and second arrays decoding the binary combinations of said input signals, all of the binary combinations of said input signals decoded by said branches of said first array differing from one another by the logic voltage levels of at least two of said input signals, and all of the binary combinations of said input signals decoded by said branches of said second array differing from one another by the logic voltage levels of at least two of said input signals; and means responsive to a voltage level transition at said node for generating said signal pulse.

7. The apparatus in accordance with claim 6 wherein said transistors comprise field effect transistors (FET's).

8. The apparatus in accordance with claim 7 wherein said transistors of said first array comprise p-channel FET's and said transistors of said second array comprise n-channel FET's, and wherein said first potential is positive with respect to said second potential.

9. The apparatus in accordance with claim 6 wherein said generating means comprises a monostable multivibrator.

* * * * *